(12) United States Patent
Kitani

(10) Patent No.: US 7,573,484 B2
(45) Date of Patent: Aug. 11, 2009

(54) IMAGE PROCESSING APPARATUS AND CONTROLLING METHOD THEREFOR

(75) Inventor: Hideyuki Kitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 11/204,262

(22) Filed: Aug. 15, 2005

(65) Prior Publication Data

US 2006/0038820 A1 Feb. 23, 2006

(30) Foreign Application Priority Data

Aug. 20, 2004 (JP) ............................. 2004-241199

(51) Int. Cl.
*G06F 12/02* (2006.01)
*G06F 13/00* (2006.01)
*G06F 13/28* (2006.01)
*G09G 5/36* (2006.01)
*G11B 5/02* (2006.01)

(52) U.S. Cl. ................... 345/543; 345/556; 360/57; 711/158; 711/159; 711/206

(58) Field of Classification Search ................ 345/543, 345/531, 556; 707/203–206; 711/159, 206–207; 360/57; 358/1.11–1.17
See application file for complete search history.

(56) References Cited

U.S. PATENT DOCUMENTS 6,629,109 B1 * 9/2003 Koshisaka ................. 707/203

2001/0025343 A1 * 9/2001 Chrisop et al. ............. 713/193
2002/0171867 A1 * 11/2002 Nobuhara et al. .......... 358/1.15
2005/0172080 A1 * 8/2005 Miyauchi ................... 711/136

FOREIGN PATENT DOCUMENTS

| JP | 09-284572 | 10/1997 |
|---|---|---|
| JP | 2003-037719 | 2/2003 |
| JP | 2004-357078 A | 12/2004 |

OTHER PUBLICATIONS

The above reference was cited in a Mar. 9, 2009 Japanese Office Action that issued in Japanese Patent Application No. 2004-241199, a copy of which is enclosed with a English Translation.

* cited by examiner

*Primary Examiner*—Xiao M Wu
*Assistant Examiner*—Tize Ma
(74) *Attorney, Agent, or Firm*—Cowan, Liebowitz & Latman, P.C.

(57) ABSTRACT

An image processing apparatus for managing a memory device having a plurality of storage areas including a storage area storing out-of-use information and a free area storing no information, the image processing apparatus comprises memory control unit adapted to determine whether or not there is a storage area storing the out-of-use information based on a request for storing information and determining the storage area storing the out-of-use information as an area for storing the information, in a case where the storage area exists; and information writing unit adapted to overwrite generated information to the storage area determined by the memory control unit.

8 Claims, 11 Drawing Sheets

IMAGE PROCESSING APPARATUS AND CONTROLLING METHOD THEREFOR

FIELD OF THE INVENTION

The present invention relates to image-processing technologies, and particularly to an image-processing technology that, for a rewritable memory device typified by a hard disk, enables management of storage areas for storing information, thereby ensuring security.

BACKGROUND OF THE INVENTION

In recent years, in order to deal with a lot of data, the number of various types of information-processing equipment having a built-in memory device, such as a hard disk, has increased. For example, in printers and copy machines, it has become common that received printing data, image data read out through a scanner, output image data, and the like are temporarily held in a hard disk, and printing processing is carried out while reading out such data.

When, in a printer or a copy machine, printing was completed, received printing data and image data that had been held in a hard disk have been deleted; however, such data was merely deleted from a management area that is referred to as FAT (File Allocation Table). In other words, logically, image data was deleted, but, physically, it was left in a hard disk.

With data being left in a hard disk, when the equipment itself or the hard disk is sneaked out, or when the data is illegally accessed through other information-processing equipment connected to the network, there is a risk that information leaks.

In order to eliminate the risk of information leakage due to residual data, files that are no longer required have to be physically erased. In this situation, "physical erasure" of a file, for example, denotes overwriting of a corresponding storage area, by means of data that itself has no specific meaning. Hexadecimal "00" or "FF" may be used for overwriting; however, in the case of a magnetic recording device such as a hard disk, data that has previously been recorded may be read out, due to residual magnetism. For more robust security, by implementing overwriting several times through irregular random numbers, traces of the data, due to the residual magnetism, have to be completely erased.

To date, in an apparatus, such as a printer and a copy machine, allegedly providing security measures, out-of-use files have been physically erased. In order to minimize the risk of information leakage, it is ideal that files that were used and are no longer required are immediately and physically erased; however, as described above, in physical-erasure processing, overwriting processing is applied to a file several times, whereby, in the case where the size of the file is large or the number of the file is large, the processing takes a long time, thereby posing a problem that processing of the following page is delayed.

In this regard, several technologies have been disclosed in which timing at which the physical erasure of a file is implemented is controlled so that processing for implementing physical erasure of a file (information) does not affect the following information processing.

Japanese Patent Laid-Open No. 9-284572 has disclosed an approach in which, in the case where processing having priority higher than that of the physical erasure of a file is implemented, the physical erasure is interrupted, or the physical-erasure processing of the file is kept undone until the printing apparatus comes into an idle state. In addition, Japanese Patent Laid-Open No. 2003-037719 has disclosed an approach in which a time zone for implementing the physical erasure of a file is controlled, based on a history of past operation.

However, the technologies disclosed in the foregoing patent literatures 1 and 2 are eventually to delay the timing of implementing physical erasure of files that have been left within a memory device such as a hard disk, so that the effect of the physical erasure, on the following data processing, is diminished; accordingly, the delay of implementation of physical-erasure processing of a file may leads to increase in opportunity of information leakage due to illegal access, thereby opposing the original object, i.e., preventing information in the memory device from leaking out. Moreover, the longer the data processing continues, the more data remains in the memory device; thus, a lot of information is exposed to the risk of leakage.

Still moreover, files that have been used and are no longer required remain in the memory device until the physical-erasure processing is implemented, thereby reducing a margin of the storage area of the memory device; therefore, there is a problem in that, in order to avoid this, a large-capacity memory device has to be mounted that includes the capacity corresponding to the margin, for the storage area, that is reduced due to consideration of security, in addition to the capacity of the memory device in the case where securing of the security is not taken into consideration. This problem becomes more conspicuous in apparatuses that continually treat full-color images, having many pixels, and the like.

Furthermore, there is a problem in that, because, in file management for a magnetic memory device such as a hard disk, as the physical-erasure processing of a file, overwriting processing, through random numbers, applied to storage areas is implemented several times, the lifetime of the memory device is drastically shortened.

Therefore, it is an object of the present invention to realize an effect equivalent to the physical-erasure processing, by, in an image processing apparatus such as a printer and a copy machine, preferentially utilizing, as an area for storing data, an out-of-use storage area in a memory device such as a hard disk, instead of simply making the out-of use storage area be a target of physical-erasure processing; it is also an object of the present invention to realize securing of security that is robuster than those of conventional technologies and to provide an image processing technology that has no adverse effect, for example, delaying the following data processing.

Moreover, it is an object of the present invention to provide an image processing technology that makes it possible to prevent reduction, of a margin of the storage area of the memory device, that is caused by accumulation of data to which the physical-erasure processing is to be applied, by utilizing storage areas for out-of-use files, in priority to free areas, and by making the storage areas store data.

Still moreover, it is an object of the present invention to provide an image processing technology that enables reduction of the number of overwriting processing for physical-erasure processing and that enables minimizing of decrease in the lifetime of a memory device, by preferentially utilizing out-of-use storage areas, as areas for storing data, instead of simply making the out-of use storage areas be objects of physical-erasure processing.

SUMMARY OF THE INVENTION

Image processing technologies provided by the present invention are characterized mainly by including the following configurations, in order to solve the foregoing problems.

The above-described object of the present invention is achieved by an image processing apparatus for managing a memory device having a plurality of storage areas including a storage area storing out-of-use information and a free area storing no information, the image processing apparatus comprising:

memory control unit adapted to determine whether or not there is a storage area storing the out-of-use information based on a request for storing information and determining the storage area storing the out-of-use information as an area for storing the information, in a case where the storage area exists; and information writing unit adapted to overwrite generated information to the storage area determined by the memory control unit.

The above-described object of the present invention is achieved by a control method for an image processing apparatus for managing a memory device having a plurality of storage areas including a storage area storing out-of-use information and a free area storing no information, the method comprising steps of:

determining whether or not there is a storage area storing the out-of-use information based on a request for storing information and determining the storage area storing the out-of-use information for storing the information, in a case where the storage area exists; and overwriting generated information to the storage area determined in the determining step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

First Embodiment, of the present invention, applied to a laser-beam printer (LBP) will be described below, referring to the accompanying drawings. Prior to the explanation for a configuration of First Embodiment, the configuration of the LBP will be described, referring to FIG. 1.

Figure 1:
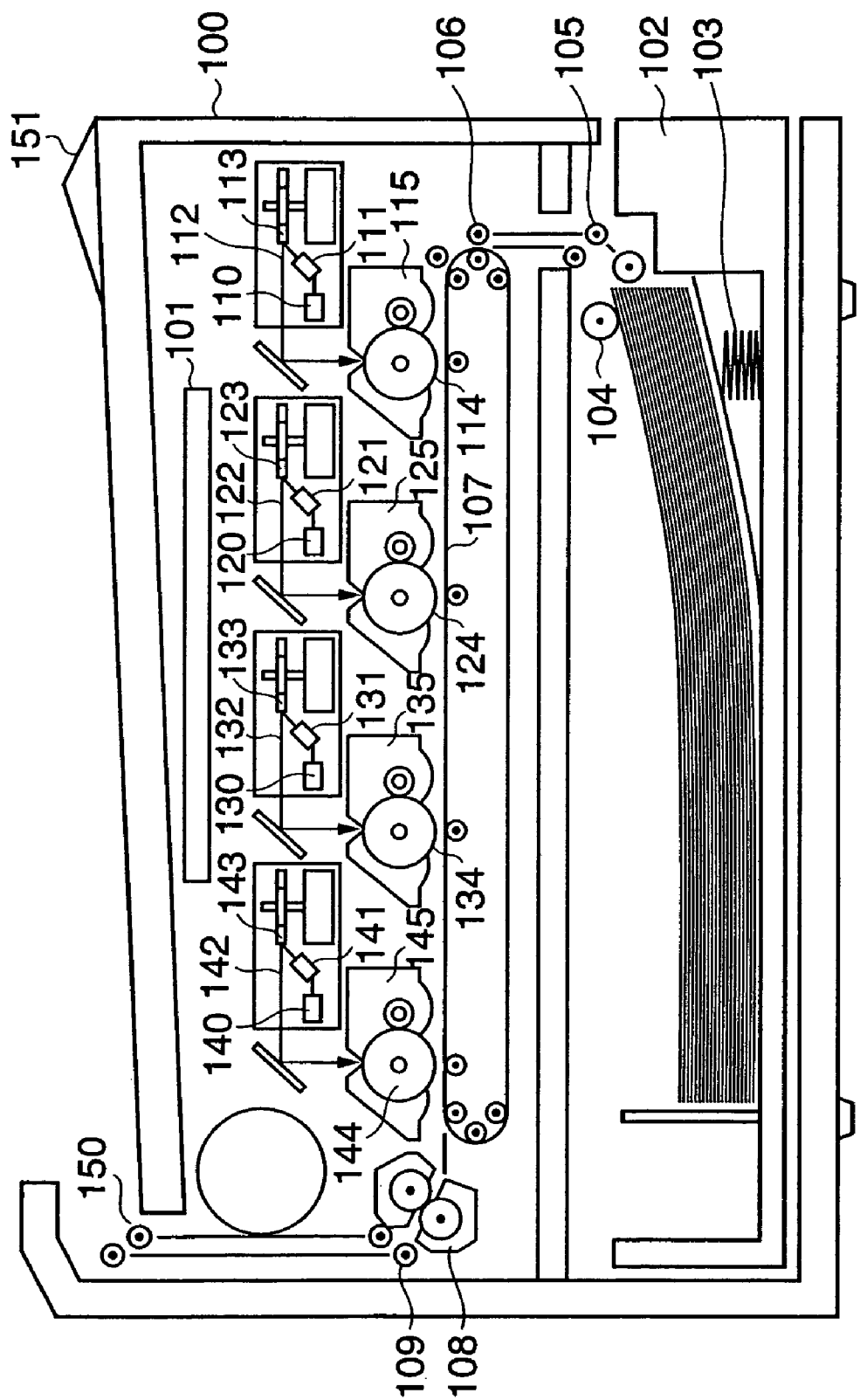
FIG. 1 is a cross-sectional view for explaining a configuration of a printer related to an embodiment of the present invention.

FIG. 1 is a cross-sectional view illustrating the internal configuration of the LBP. In FIG. 1, Reference numeral 100 denotes a LBP main body; in accordance with a paper-size-specifying instruction, a character-printing instruction, rendering instructions for various figures, an image-rendering instruction, and a color-specifying instruction and the like that are issued by a computer (indicated by Reference numeral 201 in FIG. 2) connected to a LAN 216, the LBP generates corresponding character patterns, figures, and images and the like and forms images on recording paper which is a memory medium.

Reference numeral 151 denotes an operation panel in which switches for operation, an LED display for displaying status of the printer, a LCD display, and the like, are arranged; Reference numeral 101 denotes a printer control unit for controlling the entire LBP 100 and for analyzing a character-printing instruction and the like, issued by the computer 201.

In addition, in order to convert color information in RGB into color information in M (magenta), C (cyan), Y (yellow), and K (black), and to form and develop respective images with regard to M, C, Y, and K, in parallel with each other, the LBP according to First Embodiment is equipped with respective image formation/development mechanisms for M, C, Y, and K. The printer control unit 101 (simply referred to as a "control unit", as well, hereinafter) forms respective printing images for M, C, Y, and K, converts them into video signals, and outputs the signals to respective laser drivers for M, C, Y, and K.

A laser driver 110 for M (magenta) is a circuit for-driving a semiconductor laser 111, and ON/OFF switches a laser beam 112 irradiated by the semiconductor laser 111, in response to the inputted video signal. The laser beam 112 is horizontally deflected by a rotating polygon mirror 113 to scan an electrostatic drum 114. Accordingly, an electrostatic latent image of character and figure patterns is formed on the electrostatic drum 114. The latent image is developed by a developing unit (toner cartridge) 115 provided around the electrostatic drum 114, and then is transferred onto recording paper.

Respective image formation/development mechanisms for C (cyan), Y (yellow), and K (black), similar to that for M (magenta), are provided. Elements indicated by Reference numerals 120, 121, 122, 123, 124, and 125 constitute the image formation/development mechanism for C (cyan); elements indicated by Reference numerals 130, 131, 132, 133, 134, and 135 constitute the image formation/development mechanism for Y (yellow); and elements indicated by Reference numerals 140, 141, 142, 143, 144, and 145 constitute the image formation/development mechanism for K (black). Functions of the individual elements are the same as functions of the individual elements in the image formation/development mechanism for M (magenta); therefore, explanations for them will be omitted.

As the recording paper, cut sheets are utilized: they are held in a paper-feeding tray 102 mounted on the LBP, being kept by a spring 103 at a specific height; they are introduced into the printer by means of a roller 104, transport rollers 105 and 106, and then pass through the respective image formation/development mechanisms for M, C, Y, and K, while being situated on a sheet transport belt 107.

Respective toners (powder ink), for M, C, Y, and K, that have been transferred onto the recording paper, are fixed by a fixing device 108 on the recording paper, through heat and pressure; the recording paper is outputted on the top of the LBP, by means of transport rollers 109 and 150.

Figure 2:
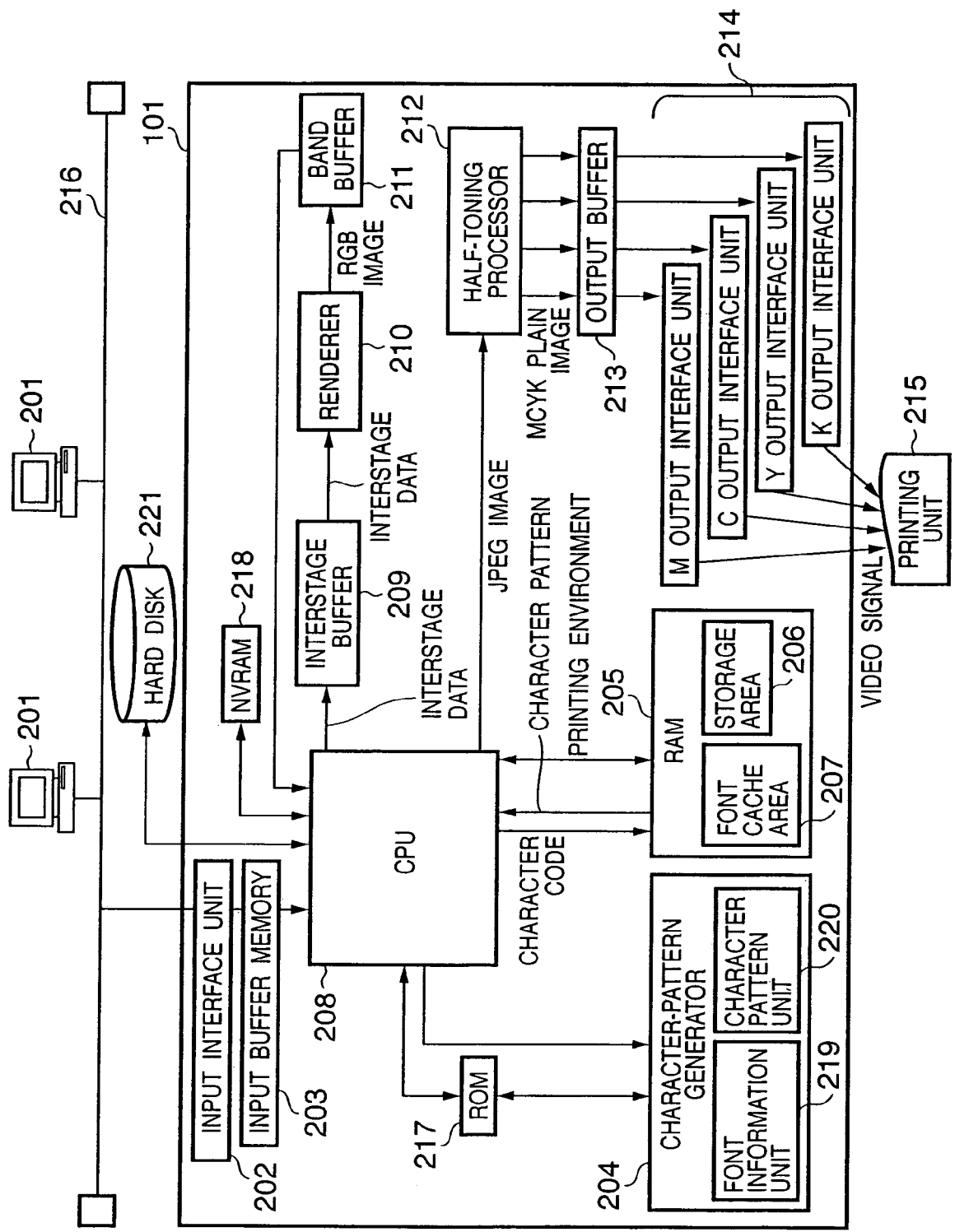
FIG. 2 is a block diagram schematically illustrating a configuration of the control unit of the LBP illustrated in FIG. 1.

FIG. 2 is a block diagram schematically illustrating a configuration of the control unit 101 of the LBP illustrated in FIG. 1. The control unit 101 of the LBP receives data, which is sent from the computer 201 connected thereto through the LAN 216, including color information, each rendering instruction for characters, figures, and images, respectively, and the like, and analyzes a character-printing instruction and the like in order to print such as document information page by page.

Reference numeral 202 denotes an input interface for receiving printing data from the computer 201; Reference numeral 203 denotes an input buffer for temporarily storing the printing data inputted through the input interface 202. The received printing data is processed after being temporarily stored in a hard disk 221, job by job.

Reference numeral 204 denotes a character-pattern generator including a font information unit 219 in which attributions, such as widths and heights of characters, and addresses of actual character patterns are stored, a character pattern unit 220 in which character patterns themselves are stored, and readout control programs. The readout control programs are included in a ROM 217 and also has a code-convert function for, when a character code is inputted, calculating the address of the corresponding character pattern.

Reference numeral 205 denotes a RAM including such as a font cache area 207 for storing character patterns outputted from the character-pattern generator 204, and a storage area 206 for storing external-character fonts sent from the computer 201 and the current printing environment. As described above, by storing, in the font cache area 207 as a font cache, patter information that has once been expanded to a character pattern, it is not required that, when the same character is printed, the same character is again decoded and expanded to a pattern; therefore, the expansion to a character pattern is accelerated.

Reference numeral 208 denotes a CPU, for controlling the entire printer control unit, that controls the entire system by means of control programs for the CPU 208, stored in the ROM 217. Reference numeral 209 denotes an interstage buffer that stores a group of internal data generated based on input data. After being received, converted into simpler interstage data, and stored in the interstage buffer, data for one page is band by band rendered by a renderer 210 and is outputted, as an RGB image having eight bits for each color, to a band buffer 211.

The RGB image outputted to the band buffer is JPEG-compressed by the CPU 208 and is stored in a hard disk 221. After the image for one page has been accumulated in the hard disk 221, the JPEG image is read out by the CPU 208 and is inputted to a half-toning processor 212. The half-toning processor 212 expands the JPEG image, further converts it into a CMYK-plane image, and outputs to an output buffer 213. The CMYK-plane image outputted to the output buffer 213 is converted by an output interface unit 214 into video signals, and the video signals are outputted to a printing unit 215 of the printer.

As described above, with reference to FIG. 1, the LBP according to First Embodiment in parallel implements each image formation/development for M, C, Y, and K, whereby the output interface unit 214 is made up of four output interface units, i.e., an M output interface unit, a C output interface unit, a Y output interface unit, and a K output interface unit; the respective output interface units, independently, band by band read out the plane images from the output buffer 213, convert them into video signals, and output the video signals to the laser drivers 110, 120, 130, and 140 for respective planes.

Reference numeral 218 denotes a nonvolatile memory configured with a common EEPROM or the like; the nonvolatile memory is referred to as the NVRAM (Non Volatile RAM). The NVRAM 218 stores panel setting values designated by the operation panel 151, and the like.

In addition, the ROM 217 described above includes functions for analyzing data inputted from the computer 201 and for creating interstage data, and control programs for the main body 215 of the printing mechanism and the like.

Reference numeral 221 denotes the hard disk that stores print data received through an input interface section 202 and rendered images as described above. In the LBP according to First Embodiment, the storage area of the hard disk 221 is managed by FAT (File Allocation Table); when received data and rendered images (JPEG images) stored in the storage-area become out-of-use, the file is not only deleted from FAT but also undergoes physically erasure so that information leakage is prevented.

<Structure of Storage Area>

Figure 3:
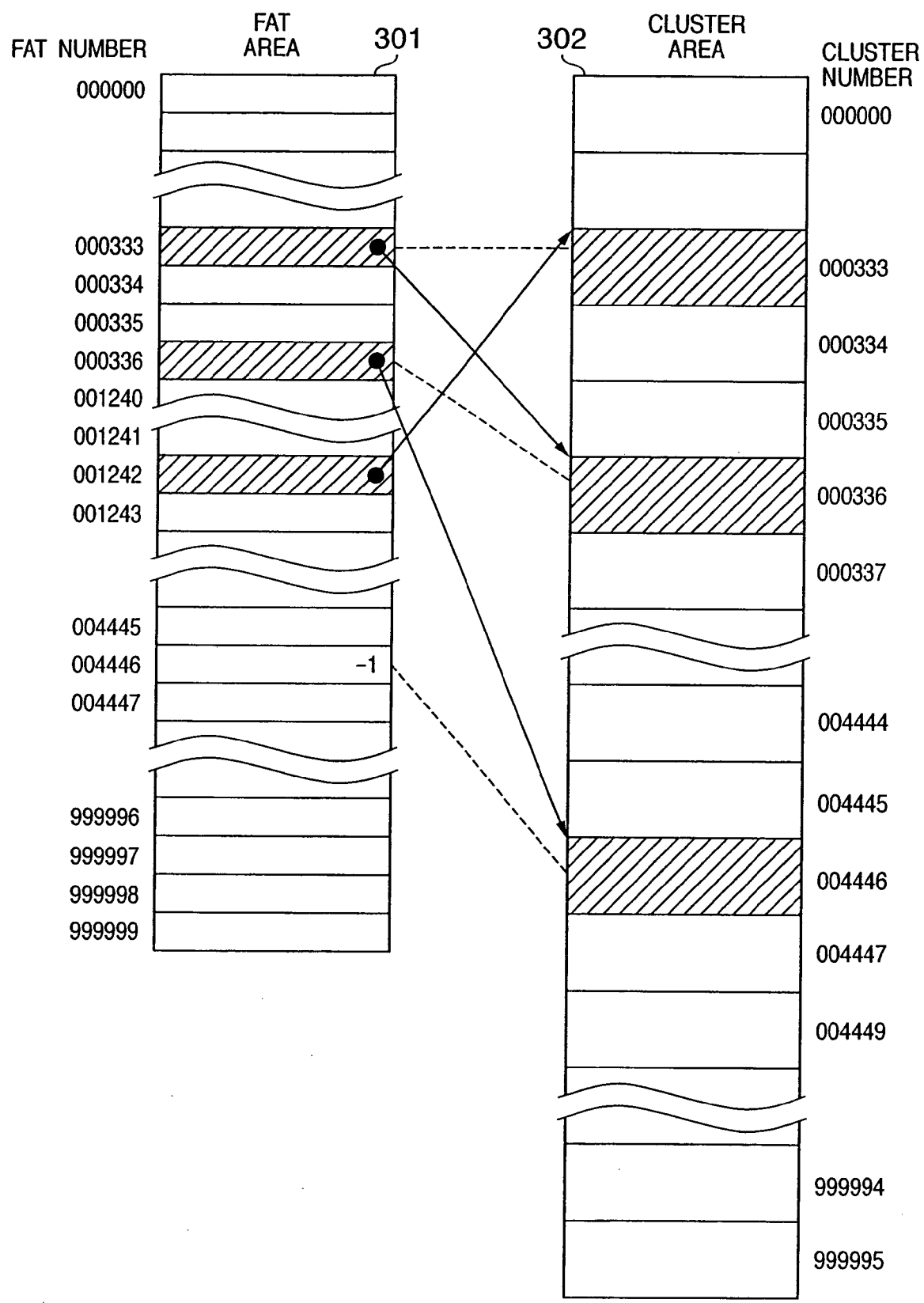
FIG. 3 is a chart symbolically representing the structure of the storage area of the hard disk.

FIG. 3 is a chart symbolically representing the structure of the storage area of the hard disk 221. The storage area of the hard-disk 221 is made up of a FAT area 301 and a cluster area 302.

The cluster area 302 is an aggregation of areas to be recorded as a file; one recording area is referred to as a cluster. It is assumed that the memory size of one cluster according to First Embodiment is 32 KB, and the number of clusters is 999,996. In other words, the total memory size of the storage areas is about 32 GB. Numbers from 000000 to 999995 are assigned to respective clusters; each one of these numbers is referred to as a cluster number.

Meanwhile, the FAT area 301 is an area for managing the cluster numbers; numbers from 000000 to 999999 are assigned to respective FAT areas; each one of these numbers is referred to as a FAT number. Links are provided from the FAT area to the cluster area, in accordance with cluster numbers stored in the FAT area (indicated by arrows in FIG. 3).

Fixed links (indicated by broken lines in FIG. 3) are provided from the cluster area to the FAT area, in accordance with FAT numbers corresponding to cluster numbers. The link structure can constitute one file. As illustrated by shaded portions, FIG. 3 represents an example of a file made up of three clusters.

Cluster numbers to make an entry into the cluster area 302 are stored in the FAT area having the FAT number of 001242; as indicated by arrows and broken lines, a link structure is formed in which links are provided between the FAT area 301 and the cluster area 302. In this situation, it is represented that the cluster areas having the numbers of 000333, 000336, and 004446 are utilized for files stored in the cluster areas. The reason why clusters are not directly linked with each other is that, when a certain trouble destructs a file, thereby destructing the links, the file can be deleted. The numeral "−1" of the FAT number 004446 indicates that the corresponding cluster having the cluster number of 004446 is a termination cluster.

<Management of Free Areas>

Figure 4:
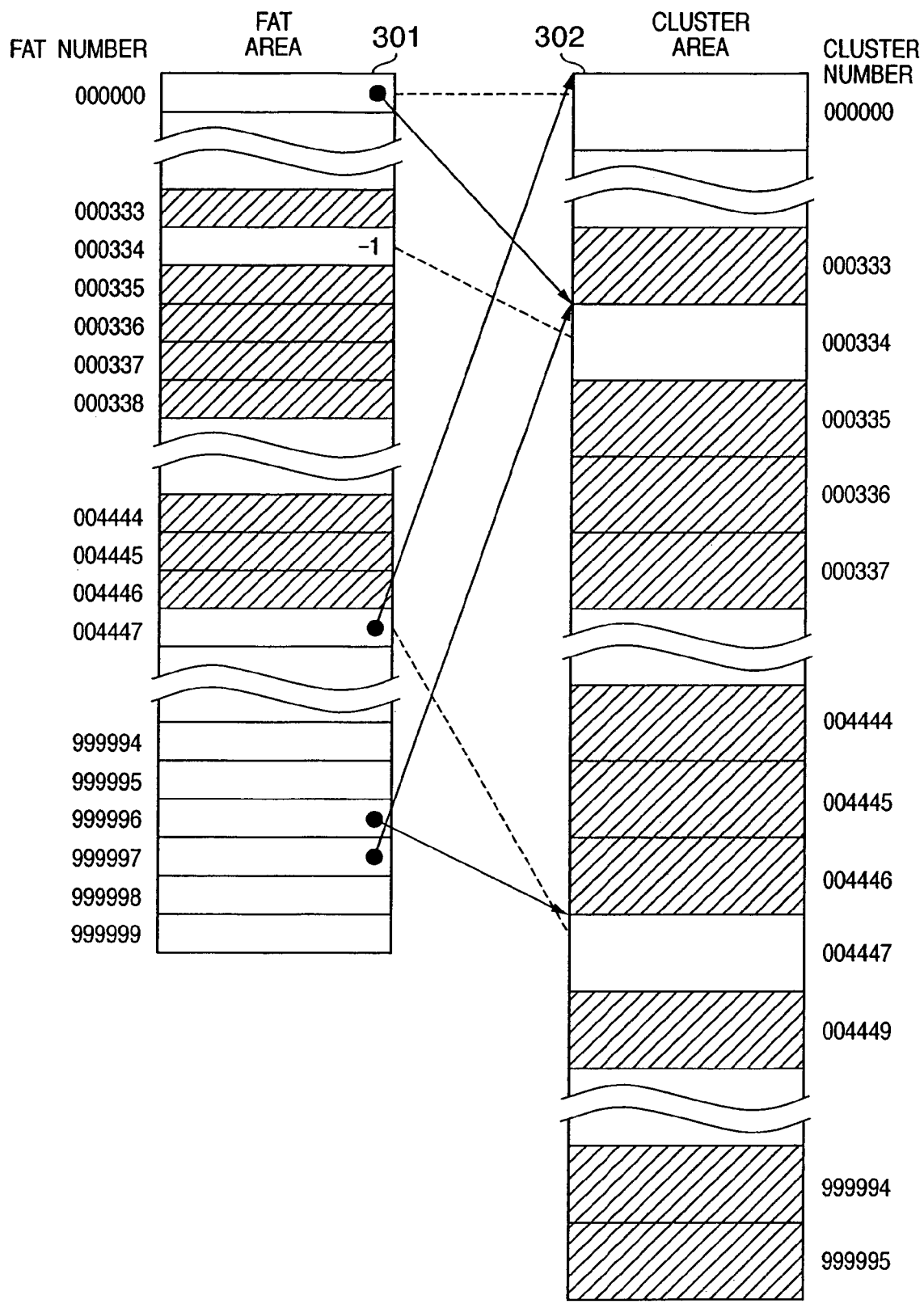
FIG. 4 is a chart for explaining management method for the free areas of the hard disk.

FIG. 4 is a chart for explaining a management method for the free areas of the hard disk 221. As is the case with ordinary files, free areas are also linked in accordance with the FAT numbers and the cluster numbers. In FIG. 4, an entry to the free areas is made in accordance with the cluster number stored in the FAT area having the FAT number of 999996; in this case, the link is provided to the cluster area having the cluster number of 004447.

In addition, the cluster number (000334) for the termination area of the free area is stored in the FAT area having the FAT number of 999997. In initial condition of the hard disk 221, all the cluster areas are empty; in accordance with the cluster numbers stored in the FAT area having the FAT number of 999996, a link is provided to the cluster area (refer to arrows and broken lines in FIG. 4).

Due to a printing job being implemented, part of the cluster area to which a link is provided in accordance with a cluster number stored in the FAT area having the FAT number of 999996 comes into use for creation or additional writing of a file in the hard disk 221. Thereafter, owing to completion of printing or the like, the data in the cluster area that has been in use becomes unnecessary; deletion processing, as described above, in which random data is overwritten two or more times, is applied to the out-of use area. Then, in the case where the cluster area to which deletion processing of a file has been applied is reinstated to a free area, in turn, a new link is provided in such a way as to follow the termination cluster to which a link is provided in accordance with a cluster number stored in the FAT area having the FAT number of 999997. Thereafter, the rearmost portion of the cluster to which the new link is provided is updated so as to be a new termination cluster. This treatment is made in consideration of durability of a hard disk, so that used areas of the hard disk do not concentrate in certain clusters. This treatment is required in a usage type in which, as the LBP according to First Embodiment of the present invention, writing and deleting of a significantly large scale of data such as an image file is frequently cycled.

<Management of Out-of-Use Areas>

Figure 5:
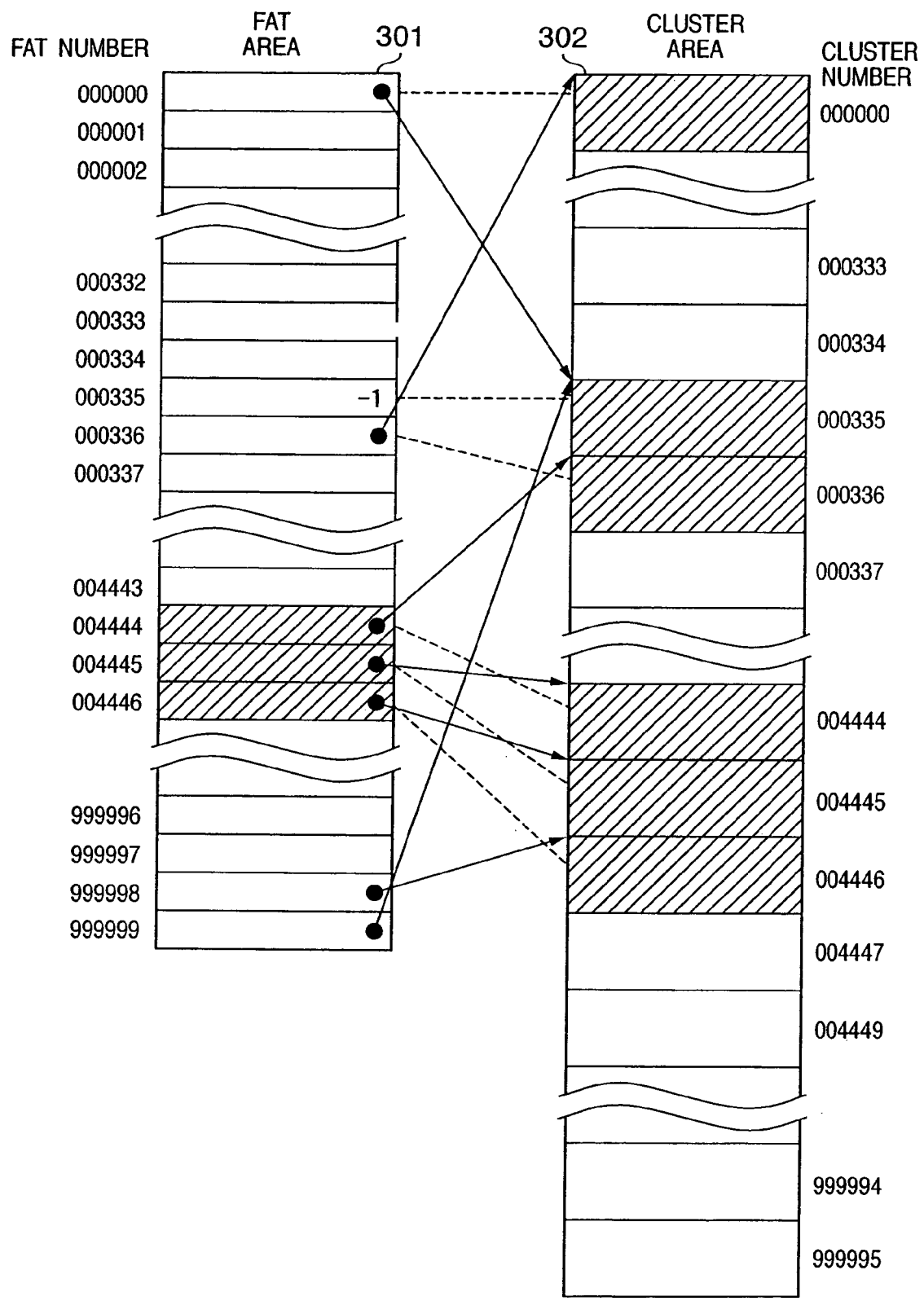
FIG. 5 is a chart for explaining a management method for out-of-use areas.

FIG. 5 is a chart for explaining a management method for out-of-use areas. The cluster that has been assigned to an out-of-use file does not return, after a file is deleted, to be linked and managed as the free areas in accordance with the cluster number stored in the FAT area having the FAT number of 999996, but is otherwise linked as an out-of-use cluster. For an entry of the out-of-use cluster, a Link is provided in accordance with the cluster number of 004446 stored in the FAT area having the FAT number of 999998. The cluster number (the cluster number of 000335) corresponding to a link termination of the out-of-use cluster is stored in the FAT area having the FAT number of 999999, and the out-of-use file is added to the termination cluster and linked. It is not until the contents is physically erased, by overwriting random data, for example, at a certain timing that the cluster that designates the out-of-use storage area and to which a link is provided in accordance with a cluster number stored in the FAT area having the FAT number of 999998 becomes a free area; as described with reference to FIG. 4, link information is added that follows the number of the termination cluster for designating a free area, stored in the FAT area having the FAT number of 999997, and that designates an area that is newly added as another free area.

<New Creation and Addition of File>

Next, a processing procedure to ensure one cluster for new file-creation and additional writing will be described with reference to a flowchart in FIG. 6. This flowchart is performed by a CPU 208 of the control unit 101 of LBP.

When a cluster ensure request for new file creation and additional writing for the hard disk 221 is issued, whether or not an out-of-use cluster exists is in the first place ascertained in the step S601. As described with reference to FIG. 5, an out-of-use cluster is linked in accordance with a cluster number that is stored in the FAT area having the FAT number of 999998; therefore, if a cluster number other than "1" is set in the FAT area having the FAT number of 999998, the set number is the number for an out-of-use cluster, and if, as a cluster number, "−1" is set in the FAT area having the FAT number of 999998, it suggests that there is no out-of-use cluster.

When an out-of-use cluster exists (S601-Yes), the processing proceeds to the step S602, and the out-of-use cluster is disconnected from the link for the out-of-use cluster. When no out-of-use cluster exists (S601-No), the processing proceeds to the step S603, and whether or not an empty cluster exists is ascertained. As discussed above, by, prior to searching in the step S603 an empty cluster, searching in the step S601 an out-of-use cluster, the out-of-use cluster is preferentially utilized as a cluster for new creation of, and additional writing in, a file.

A free area cluster is linked in accordance with a cluster number that is stored in the FAT area having the FAT number of 999996; therefore, if a cluster number other than "−1" is set in the FAT area having the FAT number of 999996, the set number is the number for the empty cluster, and if, as a cluster number, "−1" is set in the FAT area having the FAT number of 999996, it suggests that there is no empty cluster.

When a free area cluster exists (S603-Yes), the processing proceeds to the step S604, and the free-area cluster is disconnected from the link for the free-area cluster. When no free-area cluster exists (S603-No), the processing is ended being regarded as in an error condition that a cluster for new file creation and additional writing cannot be obtained.

In the step S605, in the case of additional writing of a file, the clusters obtained in the steps S602 or S604 is linked to the end of a target file; in the case of creation of a new file, a cluster for the new file is linked. In the case of creation of a new file, the FAT number that is the same as that of the obtained cluster is stored, as an entry for the file, in the FAT area.

In the step S606, corresponding to the out-of-use cluster or the free-area cluster that is disconnected through the processing in the step S602 or in the step S604, the cluster numbers that have been stored in the FAT area are changed, whereby the links to the cluster area 302 are updated.

The image processing technology provided by First Embodiment can realize an effect that is equivalent to that of the physical-erasure processing, by, in ensuring a storage area for new file creation and additional writing to a file, preferentially utilizing, as an area for storing data, the area of an out-of-use and not physically erased file, instead of simply making that area be a target of physical-erasure processing, and by overwriting and filling that area with a new file or an additional file. Moreover, compared with conventional technologies, securing of robust security can be realized, and an adverse effect, for example, delaying the following data processing, can be eliminated.

<Deletion of File>

Figure 7:
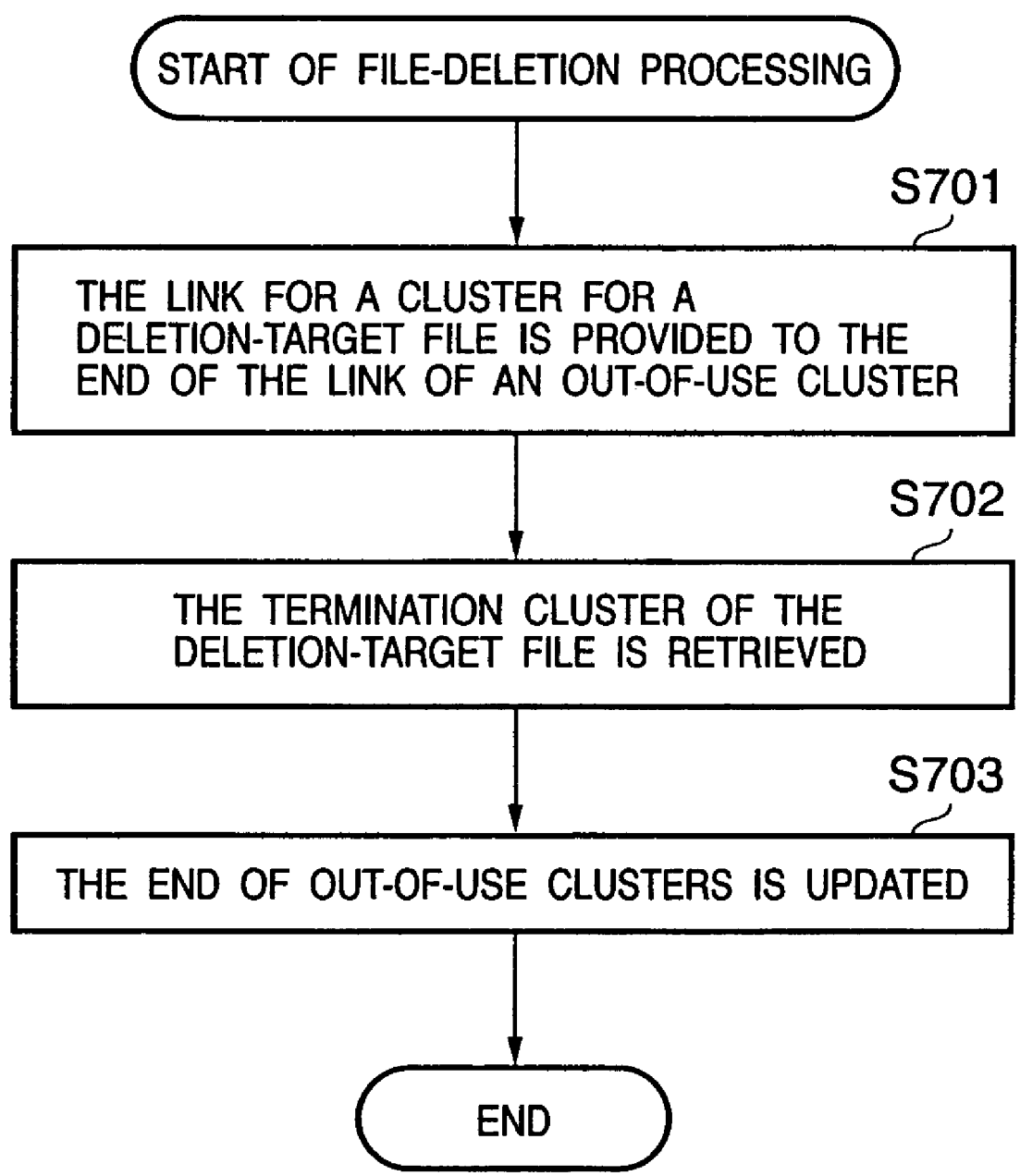
FIG. 7 is a flowchart for explaining a processing procedure in deleting a file.

Next, referring to a flowchart in FIG. 7, a processing procedure in deleting a file will be described. In the first place, in the step S701, the link for a cluster for a file that is a target of deletion is provided to the end of the link of a out-of-use cluster. Here, the end of the link of a out-of-use cluster is a cluster that is designated by the cluster number stored in the FAT area having the FAT number of 999999.

Next, in the step S702, the termination cluster of the file that is a target of deletion is retrieved. Either the link may be followed from the foremost cluster, or, for speeding up the retrieval, the cluster number of the termination cluster may be stored in the foremost cluster.

Next, in the step S703, by being replaced by the cluster number of termination cluster, of the deletion-target file, that has been retrieved in the step S702, the end-of the link for out-of use clusters, i.e., the cluster number stored in the FAT area having the FAT number of 999999, is updated; thereafter, the deletion processing of a file is completed.

<Physical Deletion of Out-of-Use Clusters>

Figure 8:
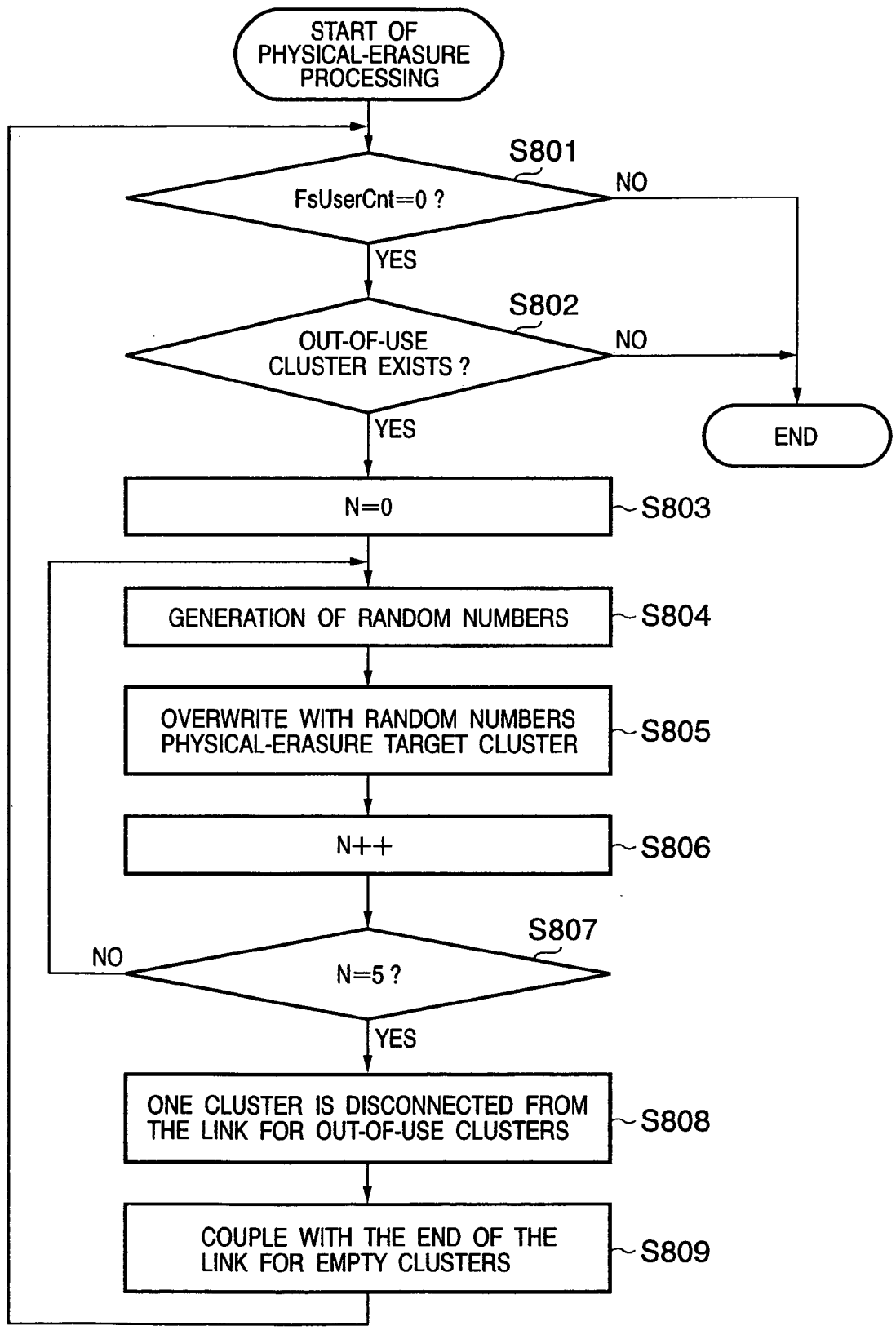
FIG. 8 is a flowchart for explaining a processing procedure in physically erasing an out-of-use cluster.

Next, referring to a flowchart in FIG. 8, a processing procedure in physical erasure of an out-of-use cluster will be described. The physical-erasure processing of an out-of-use cluster is periodically activated through a timer; in the case of First Embodiment, the duration between the end of implementation and the start of the following implementation is one second.

After the physical-erasure processing has been started, in the step S801 in the first place, a variable FsUserCnt is referred to and is determined whether or not it is zero. When the power is turned on, the FsUserCnt is reset to zero; in other tasks, when a file system (storage area managed in the FAT area of the hard disk 221) is accessed, the FsUserCnt is incremented "+1", and when the access ends, the FsUserCnt is decremented "−1". For example, when two clients access to the file system, the FsUserCnt is two. When the FsUserCnt is not zero (S801-No), i.e., when there is a task accessing the file system, the physical erasure of a cluster is ended.

For example, as a situation in which FsUserCnt is not zero, a case is conceivable in which the control unit 101 of the LBP 100 is receiving printing data and implementing writing processing of it in the hard disk 221. In this case, with physical-erasure processing in FIG. 8 being not implemented, an out-of-use cluster is preferentially utilized for writing printing data, based on the cluster-ensuring processing in FIG. 6. By putting priority on overwriting, with printing data, data in the out-of-use cluster, security for the hard disk can be secured, even though the physical-erasure processing in FIG. 8 is not implemented.

In contrast, when the FsUserCnt is zero (S801-Yes), i.e., when there is no client accessing the file system, the processing proceeds to the step S802, where whether or not an out-of-use cluster exists is ascertained.

An out-of-use cluster is linked in accordance with a cluster number stored in the FAT area having the FAT number of 999998; when the cluster number is other than "1", it suggests that there is an out-of-use cluster. When there is no out-of-use cluster (S802-No), the physical erasure of a cluster is ended. When there is an out-of-use cluster (S802-Yes), the foremost cluster in the link for out-of-use clusters, i.e., the cluster that is linked in accordance with the cluster number stored in the FAT area having the FAT number of 999998, is determined as the target of the physical erasure, and then the processing proceeds to the next step.

In addition, in the physical erasure of the hard disk 221 of First Embodiment, the trace, of data, which is produced by residual magnetism, is erased, by five times carrying out processing of overwriting a target cluster with random numbers; in the step S803, a counter for the number of writing of random numbers is reset to N=zero.

In the step S804, random numbers are generated, and then, in the step S805, the random numbers are written in the storage area of a target cluster. Thereafter, in the step S806, the number of writing is counted up, and in the step S807, whether or not the count of the number of writing has reached to 5 is determined; when the count of the number of writing has not reached to 5, the processing returns to the step S804, where generation and writing of random numbers are implemented.

When the number of the random-number writing has reached to 5 (S807-Yes), the processing proceeds to the step S808, and the processing-target cluster is disconnected from the link for out-of-use clusters; in the step S809, the link, for out-of-use clusters, that has been disconnected in the step S808, is coupled with the end of the link for empty clusters. Here, the end of the link of empty clusters is linked in accordance with the cluster number stored in the FAT area having the FAT number of 999997. When the physical erasure of the cluster and the update of the link have been completed, the processing returns to the step S801, and the similar processing as described above is repeated until FsUserCnt becomes anything but zero, or until no out-of-use cluster is left.

The management of the memory device according to First Embodiment includes the following three types of processing, which are each activated in an independent task:

reception processing for receiving printing data sent from the host computer 201 and storing job by job the printing data as a file;

job-data processing for reading out and processing job data stored as a file and for storing in a file, page by page, images obtained through rendering; and printing processing for reading out and color-converting image data stored as a file and for transferring as a video signal the converted image data to the main body 215 of the printing mechanism.

As the foregoing physical-erasure processing, when, because the image processing apparatus come into an idle state or the like, there is no request for access to a memory device such as a hard disk 221, physical erasure may be applied to the storage area for an out-of-use file that exists at the time. The physical-erasure processing itself is similar to a common method; however, the number of overwriting with random numbers or the like can be determined by the physical properties of the memory device and by the level of securing required security. In addition, without utilizing random numbers, either NULL (zero) data may be used for overwriting, or data used for overwriting may be determined in accordance with a security level.

Moreover, the image processing apparatus can be controlled in such a way that, when a request for access to a file system is issued while physical-erasure processing is being applied to an out-of-use file, the physical-erasure processing is interrupted, whereby priority is given to the request for access to a file system.

The image processing technology provided by First Embodiment makes it possible to prevent reduction, of a margin of the storage area of the memory device, that is caused by accumulation of data to which the physical-erasure processing is to be applied, through utilizing storage areas for out-of-use files in priority to free areas and making that storage areas store data.

Moreover, the image processing technology provided by First Embodiment enables reduction of the number of overwriting processing for physical-erasure processing, thereby minimizing decrease in the lifetime of a memory device, by preferentially utilizing out-of-use storage areas, as areas for storing data, instead of simply making the out-of use storage areas be objects of physical-erasure processing.

<Reception Processing>

Figure 9:
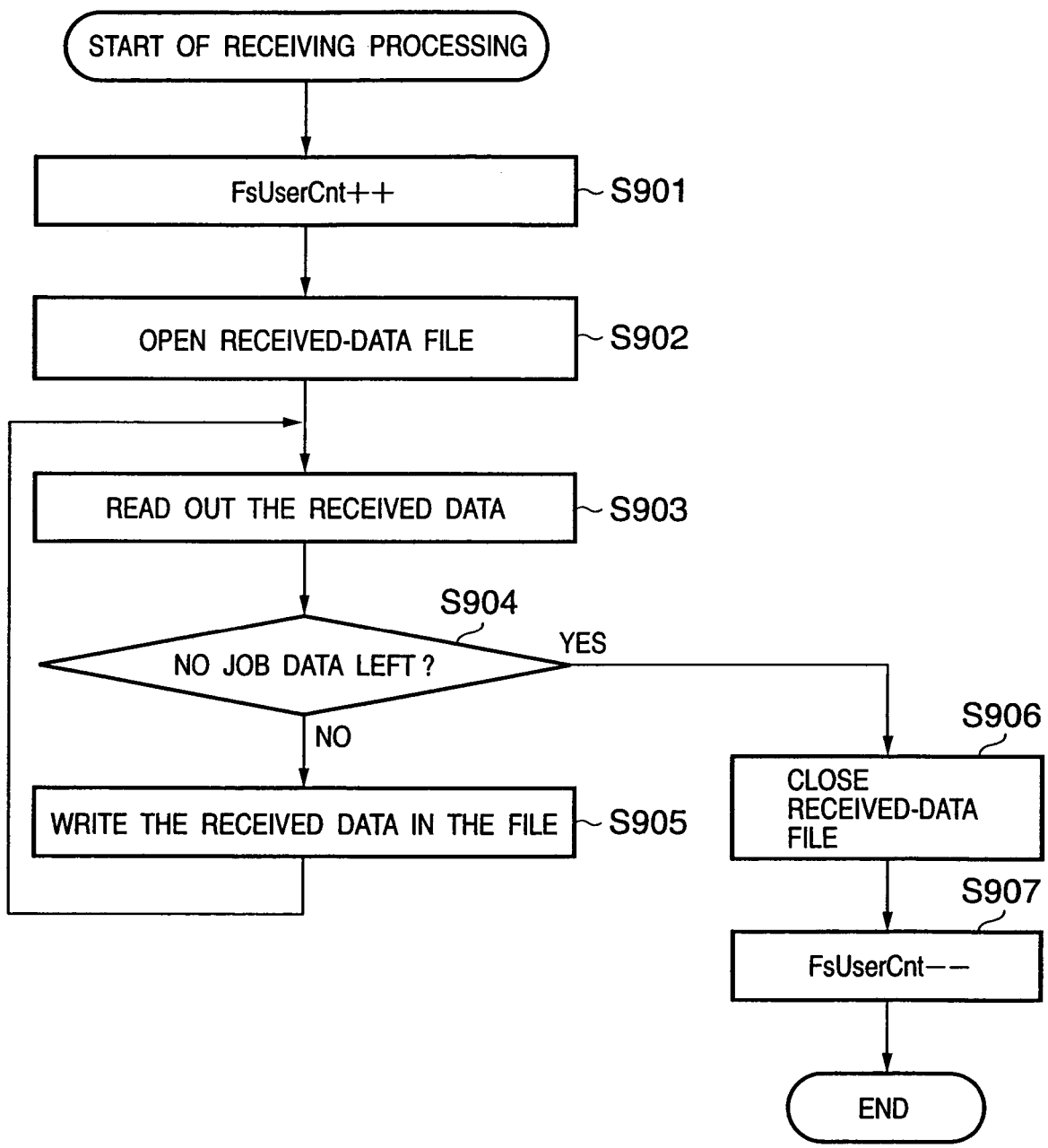
FIG. 9 is a flowchart for explaining a processing procedure in reception processing.

In the first place, referring to a flowchart in FIG. 9, a processing procedure in reception processing will be described.

The reception processing is to receive data through the input interface 202 connected to the host computer 201 by way of the LAN 216. After the reception processing has been started, in the step S901 in the first place, the variable FsUserCnt is incremented. In consequence, if physical-erasure processing of an out-of-use cluster is being implemented, the physical-erasure processing is interrupted (in the step S801 in FIG. 8).

Next, in the step S902, a file for job by job storing received data is newly opened.

Thereafter, in the step S903, the received data stored in the input buffer memory 203 is read out; in the step S904, whether or not there is no job data left is determined. When there is some job data left, the processing proceeds to the step S905, where the received data is written in the file; then, the processing returns to the step S903, where the following received data is read out. When there is no data left (S904-Yes), the processing proceeds to the step S906, where the file is closed. In the step S907 in the last place, the variable FsUserCnt is decremented; if, also in other tasks, there is no access to the file system, the processing returns to a state in which the physical-erasure processing of an out-of-use cluster can be implemented.

Figure 6:
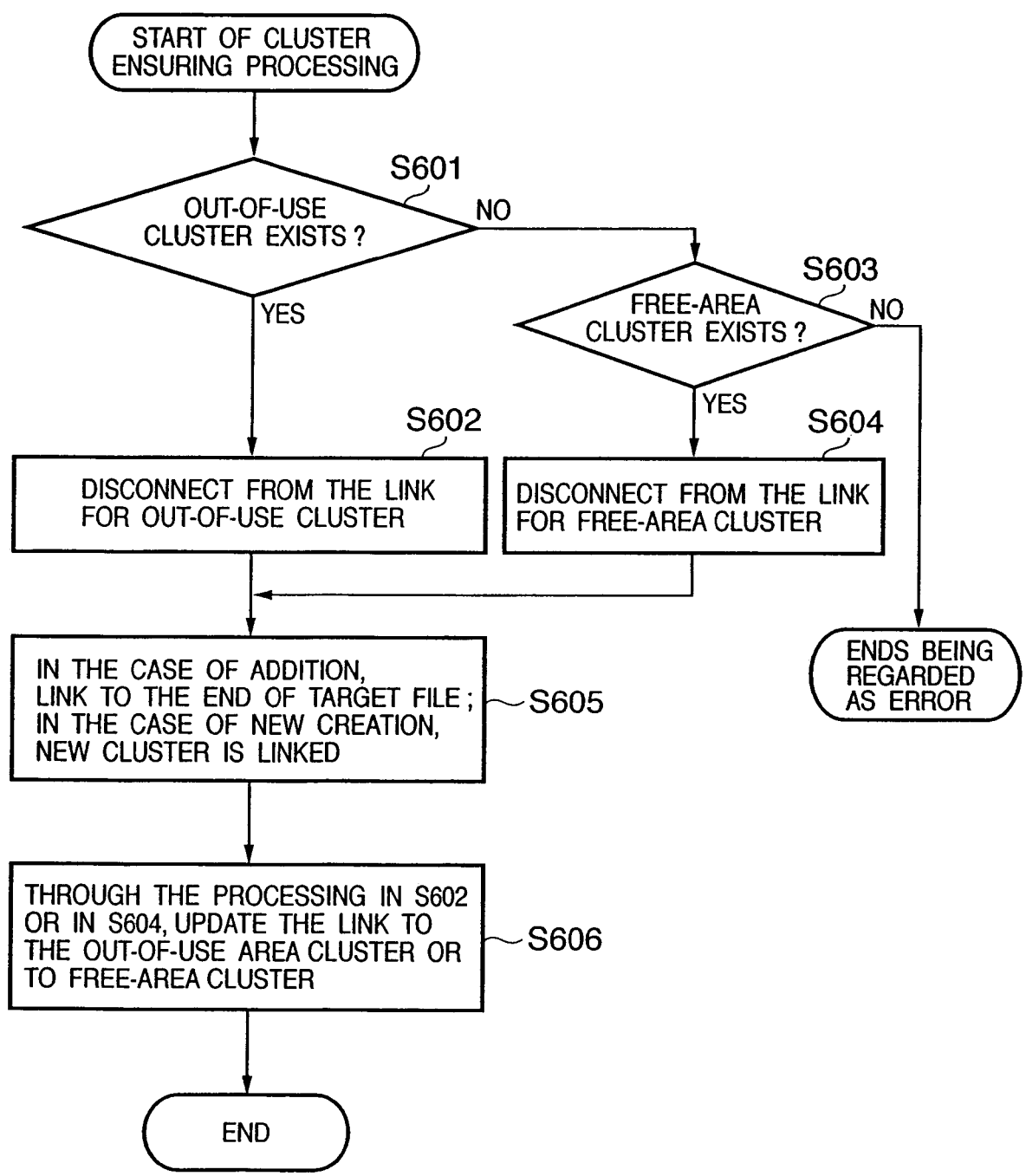
FIG. 6 is a flowchart for explaining a processing procedure for ensuring one cluster for new file-creation and additional writing.

In addition, in the steps S902 and S905, for new file creation and additional data writing, as may be necessary, ensuring of a cluster is implemented, as described in FIG. 6.

<Job-Data Processing>

Figure 10:
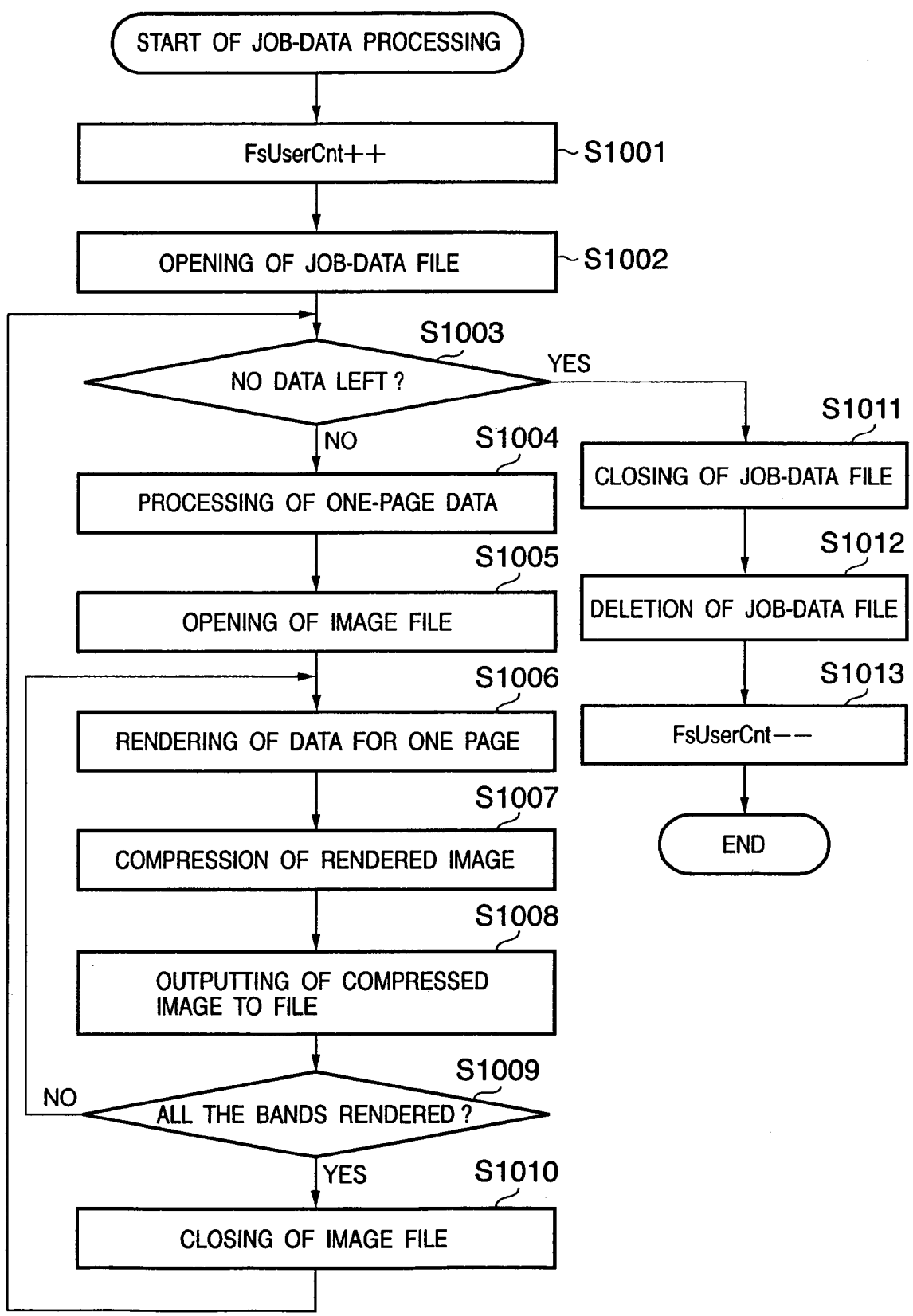
FIG. 10 is a flowchart for explaining a processing procedure for job data.

Next, referring to a flowchart in FIG. 10, a processing procedure, in job-data processing for processing job data stored in a file and creating image data, will be described.

After a job-data file has been generated and job-data processing has been started, in the step S1001 in the first place, the variable FsUserCnt is incremented.

Thereafter, in the step S1002, the job-data file is opened and then is followed by reading out of data therein.

Next, in the step S1003, whether or not there is no job data left is determined; when there is some data left (S1003-No), the processing proceeds to the step S1004. In the step S1004, data for one page is interpreted, and interstage data is outputted to the interstage buffer 209.

Next, the processing proceeds to the step S1005, where an image file for storing images is opened; in the step S1006, interstage data, for one band, that has been stored in the interstage buffer 209 and constitutes data for one page, is read out and rendered band by band. The rendering processing is implemented by the renderer 210, and an RGB image outputted to the band buffer 211.

Next, the processing proceeds to the step S1007, where the outputted one-band RGB image is JPEG-compressed; in the step S1008, the JPEG-compressed image is written in an image file. The processing proceeds to the step S1009, where whether or not one-page image formation has been completed is determined; in the case where there is any band that has not been rendered yet (S1009-No), the processing returns to the step S1006, where the following band is rendered. When the rendering of all the bands that constitute a page have been rendered (S1009-Yes), the processing proceeds to the step S1010, where the image file is closed; then, the processing returns to the step S1003, thereby implementing the processing of the following page.

When all the data for one job have been processed (S1003-Yes), the processing proceeds to the step S1011, where the job-data file is closed; further, in the step S1012, the job-data file is deleted; and, in the step S1013 in the last place, the variable FsUserCnt is decremented, thereby ending the job-data processing.

In this situation, in the step S1012, the job-data file is deleted as already described with reference to FIG. 7, and the cluster that has been utilized by the job-data file is coupled to the end of the link for out-of use clusters.

<Printing Processing>

Figure 11:
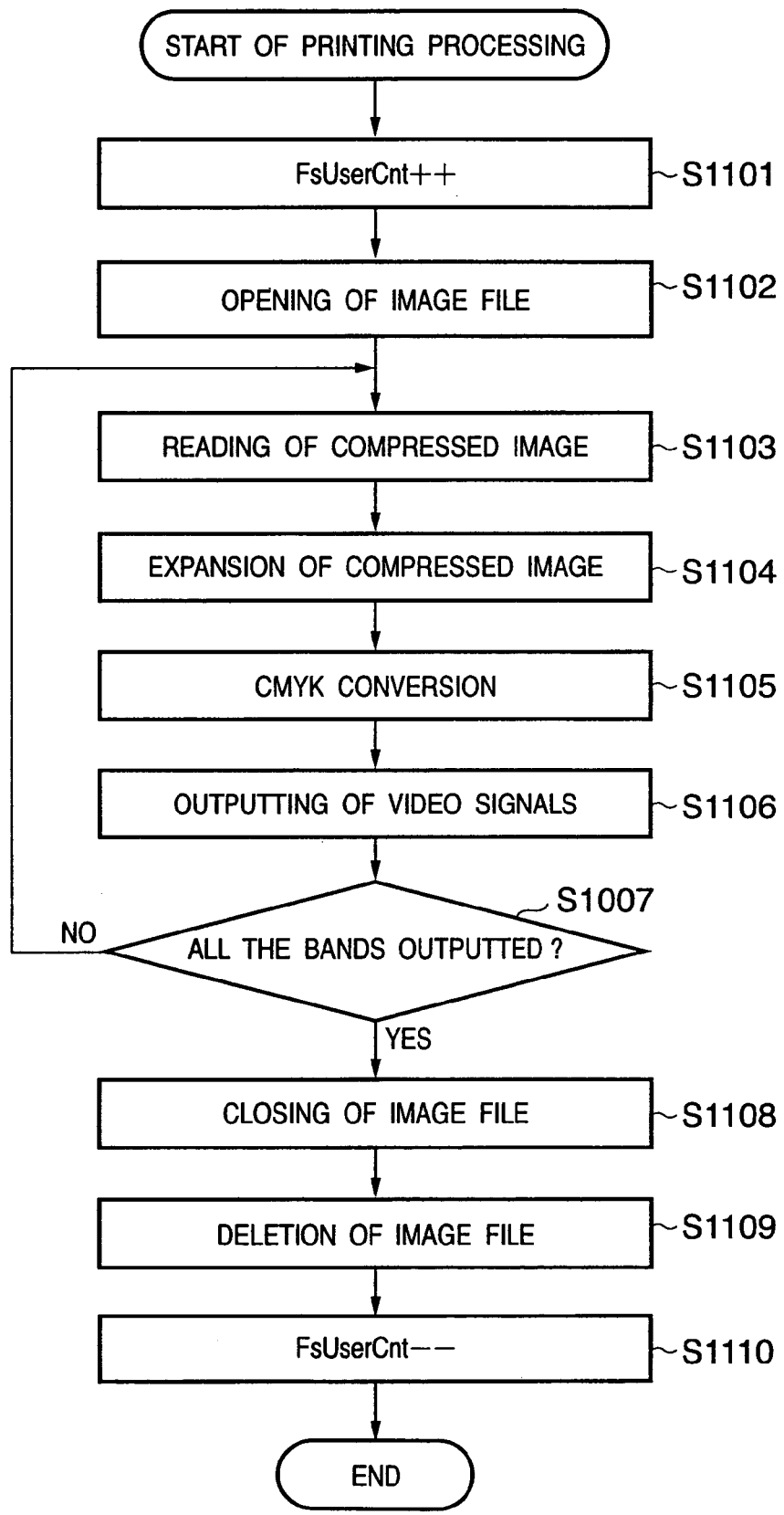
FIG. 11 is a flowchart for explaining a processing procedure for printing processing.

Next, referring to a flowchart in FIG. 11, a processing procedure in printing processing, for reading out and printing image data that is JPEG-compressed and stored in a file, will be described.

After a JPEG-compressed image file has been generated and the print processing has been started, in the step S1101 in the first place, the variable FsUserCnt is incremented.

Thereafter, in the step S1102, the image file is opened; in the step S1103, a JPEG-compressed image is read out band by band. The read JPEG image is expanded in the step S1104; further, in the step S1105, the expanded image is converted by the half-toning processor 212 from an RGB point-sequential image into CMYK frame-sequential images.

On this occasion, density and tone conversions based on the density properties of the printing mechanism 215 are concurrently implemented. When the CMYK frame-sequential images have been generated, the processing proceeds to the step S1106, where the CMYK frame-sequential images are each converted by the respective output interface units 214 for C, M, Y, and K into video signals and are outputted to the printing mechanism 215.

Then, the processing proceeds to the step S1107, where whether or not all the bands that constitute one page have been outputted is determined; in the case where there is any band that has not been outputted yet (S1007-No), the processing returns to the step S1103, where the JPEG image for the following band is read out and processed. When the video signal for one page has been sent (S1007-Yes), the processing proceeds to the step S1108, where the image file is closed; further, in the step S1109, deletion processing of the image file, described with reference to FIG. 7, is implemented. Then, in the step S1110 in the last place, the variable FsUserCnt is decremented, thereby completing one-page printing processing.

In addition, First Embodiment has been exemplified by a single-function laser beam printer (LBP); however, the purport of the present invention is not limited to the foregoing LBP, but is applicable to a digital copy machine, or a digital complex machine, that is equipped with a hard disk. In this case, in a digital copy machine and a digital complex machine, a hard disk is utilized, for example, in order to store image data, of document image, which has been read out to implement copy processing. Then, the image data that has been stored in the hard disk becomes out-of-use, due to completion of the copy processing; in applying the physical-erasure processing to the out-of-use data, processing similar to that in the Embodiment can be realized.

As described above, according to First Embodiment of the present invention, the processing from file formation to file deletion is performed through the reception processing of job data generated by a host computer, the job-data processing, and the printing processing of the job data, but the cluster for the deleted file is managed as an out-of-use storage area; thus, it is possible to realize an effect equivalent to the physical-erasure processing, by preferentially utilizing the out-of-use storage area, as an area for storing the received job data, instead of simply making the out-of use storage area be a target of physical-erasure processing, whereby it is possible to secure security that is robuster than those of conventional technologies and to eliminate adverse effects, for example, delaying the following data processing.

Moreover, First Embodiment of the present invention makes it possible to prevent reduction, of a margin of the storage area of the memory device, that is caused by accumulation of data to which the physical-erasure processing is to be applied, through utilizing storage areas for out-of-use files in priority to free areas and making that storage areas store data.

Moreover, according to First Embodiment of the present invention, even though there is the case where, when processing of printing data is completed, some storage areas are left being not overwritten and filled with other files, these storage areas are immediately, automatically, and physically erased; therefore, no risk is posed in which information that has been stored in that storage areas leaks. Still moreover, because the number of storage areas that are targets of the physical erasure is small, it is possible to solve the problem that overwriting for the physical erasure decreases the lifetime of a hard disk.

Second Embodiment

In addition, it goes without saying that the object of the present invention can also be achieved, by providing a system or an apparatus with recording media in which program codes of the software that realizes the functions of the foregoing embodiments are recorded, and by making the computer (CPU or MPU) of the system or the apparatus read out and implement the program codes stored in the recording media. The computer in which the program codes are stored is not limited to a client computer; for example, the program codes can be stored in a computer that functions as a server In this case, the program codes themselves that are read out from the storage media realize the functions of the foregoing embodiment; therefore, the storage media in which the program codes are stored constitute the present invention.

As a storage medium for providing the program codes, for example, a flexible disk, a hard disk, an optical disk, a magneto optical disk, a CD-ROM, a CD-R, a DVD, a magnetic tape, a nonvolatile memory card, a ROM, or the like can be employed.

Moreover, it goes without saying that the present invention includes not only the case where, by making a computer implement the read-out program codes, the functions of the foregoing embodiments are realized, but also the case where, by making an OS (operating system), or the like, operating on the computer implement part of or all of the actual processing, based on the instructions of the program codes, the functions of the foregoing embodiments are realized.

Furthermore, it goes without saying that the present invention also includes the case where, by storing the program codes read out from the recording media in a memory equipped in a function-enhancing board inserted into the computer, or in a function-enhancing unit connected to the computer, and then by making a CPU or the like, equipped in the function-enhancing board or the function-enhancing unit, implement part of or all of the actual processing, based on the instructions of the program codes, the functions of the foregoing embodiments are realized.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-241199 filed on Aug. 20, 2004, which is hereby incorporated by reference herein.

What is claimed is:

1. An image processing apparatus for managing a memory device having a plurality of storage areas, the image processing apparatus comprising:
an input unit adapted to input job information;
a processing unit adapted to process the job information input by said input unit;
a memory control unit adapted to manage the memory device by classifying the memory device into a plurality of storage areas including (i) a storage area for storing the job information input by the input unit, (ii) a storage area which stores out-of-use information, and (iii) a free storage area; and
a physical-erasure unit adapted to make a storage area be in a state of being physically erased by overwriting predetermined information in the storage area which stores the out-of-use information,
wherein the memory control unit manages the memory device so that a storage area, which is included in the storage area for storing the job information input by the input unit and stores job information processed by the processing unit, is updated as the storage area which stores out-of-use information, and
the memory control unit manages the memory device so that a storage area, which is included in the storage area which stores the out-of-use information and is physically erased by the physical-erasure unit, is updated as the free storage area, and
when the input unit receives the job information, (i) in a case where the storage area which stores the out-of-use information exists, the memory control unit controls the memory device so that the job information is stored in the storage area which stores the out-of-use information in priority to the free storage area, and (ii) in a case where the storage area which stores the out-of-use information does not exist, the memory control unit controls the memory device so that the job information is stored in the free storage area.

2. The image processing apparatus according to claim 1, wherein the memory device comprises first link information for specifying a first storage area which stores the out-of-use information and a management area for storing second link information that specifies the free area, and
wherein said memory control unit determines whether or not there is a the first storage area which stores the out-of-use information based on the first link information, and specifies the free area based on the second link information.

3. The image processing apparatus according to claim 2, wherein the management area further stores third link information for specifying a second storage area that stores unprocessed information, and
wherein said memory control unit generates the third link information for specifying the second storage area in a case where the job information is requested to be stored, and stores the job information in the second storage area specified based on the third link information.

4. The image processing apparatus according to claim 3, wherein said memory control unit adds link information for specifying a storage area storing the job information to the third link information for specifying the second storage area, in a case where the request for storing the job information is with regard to addition of information to already stored job information, and updates the third link information.

5. The image processing apparatus according to claim 3, wherein said memory control unit adds the third link information to the first link information so that the second storage area can be utilized for storing information, in a case where a request for deleting the unprocessed information stored in the second storage area specified by the third link information is received, and updates the first link information.

6. The image processing apparatus according to claim 1, further comprising an access determining unit adapted to determine whether or not there is access to information stored in the storage area,
   wherein said physical-erasure unit ends processing for making the storage area be in a state of being physically erased, in a case where it is determined by said access determining unit that there is the access.

7. A control method for an image processing apparatus for managing a memory device having a plurality of storage areas, the method comprising steps of:
   inputting job information;
   processing the job information input by said inputting step;
   managing the memory device by classifying the memory device into a plurality of storage areas including (i) a storage area for storing the job information input in the inputting step, (ii) a storage area which stores out-of-use information, and (iii) a free storage area; and
   making a storage area be in a state of being physically erased by overwriting predetermined information in the storage area which stores the out-of-use information,
   wherein the managing step manages the memory device so that a storage area, which is included in the storage area for storing the job information input by the input unit and stores job information processed in the processing step, is updated as the storage area which stores out-of-use information, and
   the managing step manages the memory device so that a storage area, which is included in the storage area which stores the out-of-use information and is physically erased in the making step, is updated as the free storage area, and
   when the job information is received in the inputting step, (i) in a case where the storage area which stores the out-of-use information exists, the managing step controls the memory device so that the job information is stored in the storage area which stores the out-of-use information in priority to the free storage area, and (ii) in a case where the storage area does not exist, the managing step controls the memory device so that the job information is stored in the free storage area.

8. A computer-readable memory medium for storing a program that causes a computer to implement a control method defined by claim 7.

* * * * *